United States Patent [19]
Amler

[11] Patent Number: 5,280,419
[45] Date of Patent: Jan. 18, 1994

[54] METHOD AND SWITCHING ARRANGEMENT FOR REGULATION OF A TWO-DIMENSIONAL VECTOR OF A SEGMENT BY MEANS OF A VALUE-DISCRETE SETTING ELEMENT WITH A LIMITED SWITCHING FREQUENCY

[75] Inventor: Gerald Amler, Nürnberg, Fed. Rep. of Germany

[73] Assignee: Siemens Aktiengesellschaft, Munich, Fed. Rep. of Germany

[21] Appl. No.: 858,335

[22] Filed: Mar. 26, 1992

[30] Foreign Application Priority Data

Mar. 26, 1991 [EP] European Pat. Off. ........ 91104819.7

[51] Int. Cl.⁵ .................... H02M 7/525; H02P 5/40
[52] U.S. Cl. ...................................... 363/37; 363/160; 318/811
[58] Field of Search .............. 363/37, 160, 41, 98, 363/96; 318/803, 811

[56] References Cited

U.S. PATENT DOCUMENTS

| | | | |
|---|---|---|---|
| 4,159,513 | 6/1979 | Gemp et al. | 363/43 |
| 4,488,215 | 12/1984 | Pfaff et al. | 363/159 |
| 4,978,894 | 12/1990 | Takahara | 318/768 |
| 5,182,701 | 1/1993 | Mochikawa et al. | 363/98 |

*Primary Examiner*—Steven L. Stephan
*Assistant Examiner*—Ben Davidson
*Attorney, Agent, or Firm*—Kenyon & Kenyon

[57] ABSTRACT

A method and a switching arrangement are provided for regulating a two-dimensional vector of a controlled system with a discrete value final controlling element having a limited switching frequency. The discrete value final controlling element also has limited number of actual-value vectors. A switching arrangement, such as a microprocessor, receives actual values for the two-dimensional vector as well as a reference vector and selects three actual-value vectors that are adjacent to the reference vector. The switching arrangement generates a reference trajectory which represents a sequence of vector settings for the discrete value final controlling element. A switch from one actual-value vector to another takes place when the distance between the two-dimensional vector and a next corner point of the reference trajectory is at a minimum. The resulting mean value of the generated two-dimensional vector is equal to the reference vector.

19 Claims, 11 Drawing Sheets

METHOD AND SWITCHING ARRANGEMENT FOR REGULATION OF A TWO-DIMENSIONAL VECTOR OF A SEGMENT BY MEANS OF A VALUE-DISCRETE SETTING ELEMENT WITH A LIMITED SWITCHING FREQUENCY

BACKGROUND OF THE INVENTION

The present invention relates to a method and apparatus for regulating a two-dimensional vector of a controlled system with a discrete-value final controlling element having a limited switching frequency.

Discrete-value final controlling elements only have a limited number of different states which can be set at their outputs. If an intermediate value is to be generated, an approximation is achieved by switching back and forth between adjacent states. The approximate value to be generated is a value averaged over time. The low-pass effect which is generally present in the regulation segment in technical systems smoothes the alternating variable produced.

If a two-dimensional vector of a controlled system is to be set, it is insufficient to consider each dimension separately, since they are in part dependent upon one another. Therefore, a change in the state of the final controlling element causes a change at more than one output.

Known control methods generally proceed from a one-dimensional approach. However, such an approach fails to take into consideration the manner in which the different outputs of the final controlling element depend upon each other as well as the internal states of the final controlling element.

Direct current regulation for rotary current drives using pulse inverters is described in "Regelungstechnische Praxis," Volume 24, 1983, Issue 11, pages 472 to 477. A very simple solution in terms of equipment is represented by two-point regulation. Such a regulation consists of three two-point regulators subjected to hysteresis. These regulators always cause a status change if the difference between the reference value and the actual value exceeds a certain limit. The system can therefore follow a changing reference value with maximum speed. This regulator type is used in intermediate circuit voltage inverters for regulating phase currents. Since the resulting phase currents are dependent upon one another, the switching states are not always optimal.

If the reference value periodically passes through a certain function, then suitable switching time points (with reference to the period) can be calculated in advance. The dependence of several phases on one another can be possibly taken into consideration. The disadvantage of this method is that a separate pulse pattern has to be calculated for each operating point (period duration and level). Each shift of the operating point requires a transition between pulse patterns. This transition can take a long time, in some cases, since a change in pulse pattern is only permitted at certain times within a period. At the same time, errors occur during the dynamic process, since the pulse pattern is not operated at its optimum point.

A one-dimensional process (two-point regulator with hysteresis) can be expanded to a multi-dimensional case. For this process, a hysteresis region around a reference value is predetermined instead of the hysteresis width. As soon as the actual value seeks to leave the region, a switch to another state takes place, which brings the actual value back to the inside part of this hysteresis region. With this method, the actual value is always kept within the vicinity of the reference value. Even if the reference value changes, quick following is guaranteed. The switching frequency can be influenced by the size of the hysteresis region, but cannot be precisely predetermined.

Such a multi-dimensional method is described as predictive current regulation in "Messen-Steuern-Regeln," No. 13, June 1989, pages 20 to 23, and "EPE," 1987, pages 647 to 652, entitled "New Predictive Control Strategy for PWM-Inverters." A further example of predictive current regulation with optimization in reach time for a pulse inverter is described in "IPEC," Tokyo 1983, pages 1665 to 1675. A multi-dimensional method for a GTO-I inverter is described in the lecture "Four Quadrant AC-Motor Drive with A GTO Current Source Inverter With Low Harmonics And On Line Optimized Pulse Pattern" by O. Hintze and D. Schröder, printed in the "IPEC" Conference Minutes, Tokyo 1990, pages 405 to 412.

With this method, the reference value can be reached by approximation, but it is not set as a mean value over time. It is possible that the trajectory of the actual value stays in a part of the hysteresis region for an extended period of time. This results in a mean value which is not equal to the reference value in every direction. This error has to be compensated with another regulator. This effect is particularly disruptive with large hysteresis regions and, therefore, small switching frequencies.

With a multi-dimensional method, a relatively low switching frequency and good control dynamics are achieved. The disadvantages of the method with precalculated pulse patterns are avoided in this method. However, even in this method the switching frequency cannot be predetermined precisely because it depends on the operating point at each point in time and varies greatly. Another disadvantage of this method is that the voltage is regulated, for example, but not the integral above the voltage, i.e. the current. For example, it is possible that the mean value of the voltage only becomes zero in one direction, and thus the current in the orthogonal direction to the voltage deviates significantly from the reference value for an extended period of time. Simply by activating the inverter, an error in the current is caused, which has to be balanced out again with a regulator which acts on the hysteresis region.

There is a need for a method and a switching arrangement for regulating a two-dimensional vector of a controlled system with a discrete-value final controlling element having a limited switching frequency that avoids the aforementioned disadvantages.

SUMMARY OF THE INVENTION

This and other needs are satisfied by the method and apparatus of the present invention. The method of the present invention comprises the regulation of a two-dimensional vector of a controlled system with a discrete-value final controlling element having a limited switching frequency. The reference value of this two-dimensional vector is approximated as an average value over time by selecting three manipulated variable actual values adjacent to a manipulated variable reference value. The three selected manipulated variable actual values are alternated in a predetermined sequence and at predetermined interval times during a switching period in such a way that the mean value of the actual vector, while passing over a reference trajectory formed by the manipulated variable actual values, is equal to its reference value. A switch from one manipulated variable actual value to the next manipulated variable actual value takes place precisely when the distance between the actual vector and a next corner point of the reference trajectory is at a minimum.

In this manner, the optimum local curve for the actual vector is determined. The switching time points are determined in such a way that the actual vector of the controlled system exit runs into this local curve. This is achieved because the switch takes place precisely at that time. In other words, the next vector of the selected manipulated variable vector triplet is selected if the distance between the vector of the controlled system exit and the next corner point of the local curve (trajectory) reaches a minimum.

With this method, a minimum deviation from the reference value is obtained with a given switching frequency, where the time mean coincides with the reference value, and the shortest possible control time is achieved.

In a current impressing inverter having thyristors that can be shut off (e.g., a GTO-I inverter), where capacitors are arranged between the inverter and the machine, the capacitor voltage and the machine current are taken into consideration in the regulation. Since these variables are vectors, two-dimensional optimization takes place. In other words, not only the vector of the capacitor voltage is kept close to the reference vector, but also its mean value, and thus the machine current, is set correctly with only one variable (switching time point) being available.

A second condition in this method is that the machine current should deviate as little as possible from the reference current. This is achieved when the voltage vector runs along the calculated reference trajectory and the integral over a voltage reference-actual difference over a pass becomes zero.

The method of the present invention can also be used in the net-side current converter of the current impressing GTO-I inverter. Likewise, this method can be used for a voltage impressing inverter, also called a pulse inverter.

The switching arrangement of the present invention includes a microprocessor which generates an interrupt signal, which is cyclically triggered in a fixed time grid. After the interrupt signal is generated, the actual values and the reference values are read into the microprocessor. The remaining time and the vector number of the related manipulated variable actual value are generated at the output of the microprocessor. Also, several switching signals are generated at the outputs of the microprocessor.

As the switching arrangement, a microprocessor is provided, to which the reference values and actual values of the vectors are passed to the switching arrangement, which is coupled with the current converter valves of the discrete final controlling element on the output side, via a control set. The microprocessor processes the aforementioned method of the present invention, and generates a remaining time interval between scanning and the switching action to be performed, and the number of the next status of the final controlling element. While the control set carries out the status change, the microprocessor has already calculated the next calculation.

Another feature of the method of the present invention is that the proportional interval times of the three selected manipulated variable actual values can be separately determined according to the following equations.

$$\begin{bmatrix} \dot{y}_{sn} & \dot{y}_{sn+1} & \dot{y}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}$$

$$\begin{bmatrix} \dot{u}_{sn} & \dot{u}_{sn+1} & \dot{u}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}$$

$$\begin{bmatrix} \dot{i}_{sn} & \dot{i}_{sn+1} & \dot{i}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}$$

A corner point of the generated reference trajectory is separately determined according to the following equations.

$$(y_{so} - y_s)T_{ges} + \dot{y}_{sn}\left(\frac{T_n^2}{2} + T_n T_{n+1} + T_n T_{n+2}\right) +$$

$$\dot{y}_{sn+1}\left(\frac{T_{n+1}^2}{2} + T_{n+1}T_{n+2}\right) + \dot{y}_{sn+2}\frac{T_{n+2}^2}{2} = 0$$

$$(u_{so} - u_s)T_{ges} + \dot{u}_{sn}\left(\frac{T_n^2}{2} + T_n T_{n+1} + T_n T_{n+2}\right) +$$

$$\dot{u}_{sn+1}\left(\frac{T_{n+1}^2}{2} + T_{n+1}T_{n+2}\right) + \dot{u}_{sn+2}\frac{T_{n+2}^2}{2} = 0$$

$$(i_{so} - i_s)T_{ges} + \dot{i}_{sn}\left(\frac{T_n^2}{2} + T_n T_{n+1} + T_n T_{n+2}\right) +$$

$$\dot{i}_{sn+1}\left(\frac{T_{n+1}^2}{2} + T_{n+1}T_{n+2}\right) + \dot{i}_{sn+2}\frac{T_{n+2}^2}{2} = 0$$

The remaining time until a switching point is separately determined according to the following equations.

$$(t_s - t_o) = \frac{\dot{y}_{s1}(y_{so1} - y_{s1}(t_o)) + \dot{y}_{s2}(y_{so2} - y_{s2}(t_o))}{\dot{y}_{s1}^2 + \dot{y}_{s2}^2}$$

$$(t_s - t_o) = \frac{\dot{u}_{s1}(u_{so1} - u_{s1}(t_o)) + \dot{u}_{s2}(u_{so2} - u_{s2}(t_o))}{\dot{u}_{s1}^2 + \dot{u}_{s2}^2}$$

$$(t_s - t_o) = \frac{\dot{i}_{s1}(i_{so1} - i_{s1}(t_o)) + \dot{i}_{s2}(i_{so2} - i_{s2}(t_o))}{\dot{i}_{s1}^2 + \dot{i}_{s2}^2}$$

If a negative value is determined for the remaining time, a switch to the next manipulated variable actual value immediately takes place. If a negative value is determined for a interval time, the related manipulated variable actual value is not taken into consideration for calculating the switching time.

DETAILED DESCRIPTION

Figure 1:
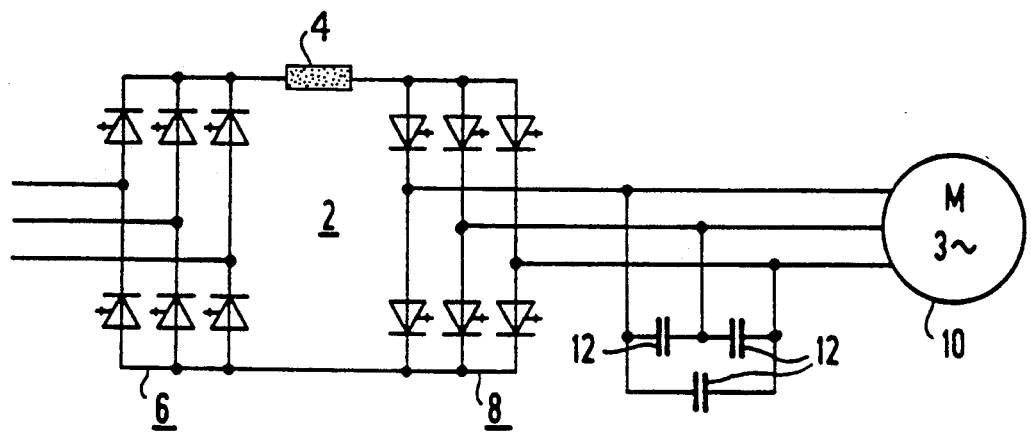
FIG. 1 is a block diagram of an induction machine with power supplied from a network by a current impressing inverter having current converter valves that can be shut off and capacitors coupled to the induction machine.

Referring to FIG. 1, an intermediate circuit current converter 2 is shown. A current impressed by approximation via a choke 4 is switched onto two of the three phases so that a closed circuit is always formed. The net-side inverter 6 and the machine-side inverter 8 are each structured with current converter valves that can be shut off, especially gate-turn-off thyristors (GTO thyristors). The machine-side inverter 8 can also be equipped with conventional thyristors. With these current converter valves, it is possible to interrupt the current directly. Due to the inductances of the machine 10, however, very high voltage peaks form, which can lead to destruction of the machine-side inverter 8. These voltage peaks can be significantly reduced by including capacitors 12 in the circuit. However, some other effects occur as a result:

The inverter current $i_p$ (FIG. 2) no longer flows only into the machine 10, but also into the capacitors 12, which means that the direct intervention in machine currents is lost.

The block-shaped currents are smoothed by the capacitors 12, which causes the losses in the machine to become less and the torque waviness to be reduced.

The capacitors 12 form an oscillating circuit with the leakage inductance $\sigma L_S$ of the machine 10, which is only attenuated by the relatively small stator resistance $R_s$. However, this oscillating circuit is excited by every switching action of the inverter 8.

Reactive power is generated by the capacitors 12, which is consumed in the machine 10. At a certain frequency, the reactive power demand of the machine is completely covered by the capacitors 12 (self-excitation), which means that the system machine 10 is in idle and no longer takes any current $i_s$ from the inverter 8.

Since the current $i_s$ is no longer impressed in the machine 10, the stator differential equation has to be considered for the regulation of the machine 10.

Further differential equations result from the capacitors 12, i.e. from the capacitor voltages $u_s$ (stator voltages), which must be included in the calculation, and the order of the differential equation system is increased by a factor of 2.

If the stator currents $i_s$ and stator voltages $u_s$ are included in the regulation and if the control of the drive is sufficiently quick, the oscillation circuit should not present any problem. In order to have sufficient intervention on the controlled system 10, 12, the only important consideration is that the switching frequency $f_s$ of the inverter 8 is greater than the inherent frequency of the oscillating circuit. The scanning frequency must also be sufficiently large.

Figure 2:
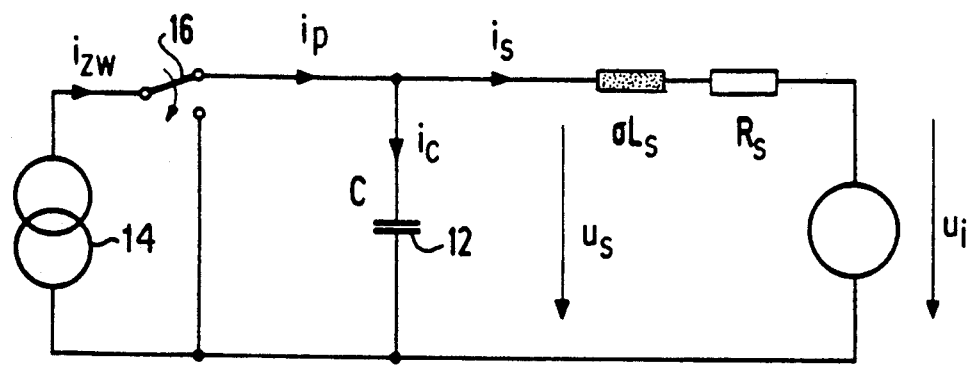
FIG. 2 is a block diagram of a simplified single-phase equivalent circuit of the circuit of FIG. 1.

Referring to FIG. 2, the single-phase equivalent schematic of the drive of FIG. 1 with complex variables is shown. The net-side inverter 6 having the intermediate circuit is reduced to a simple current source 14, and the machine-side inverter 8 is symbolically replaced by a switch 16. The current source 14 and switch 16 generate the complex vector $i_p$ which lies in the spacial plane of the scalar variable of the intermediate circuit current $i_{zw}$. Since the intermediate circuit current $i_{zw}$ is a constant variable, the inverter 8 must be controlled so hat there is always a closed and unambiguous current path through the inverter 8 and the machine 10. Consequently, one switch at the top of the bridge of the machine-side current converter 8 always has to be closed, and one switch has to be closed at the bottom. If more than two switches are closed, no definable state can be achieved. Therefore, there are nine possible switch settings. Of these, six of the switch settings are regular vectors, and three are zero vectors (i.e. bridge short circuits).

Figure 3:
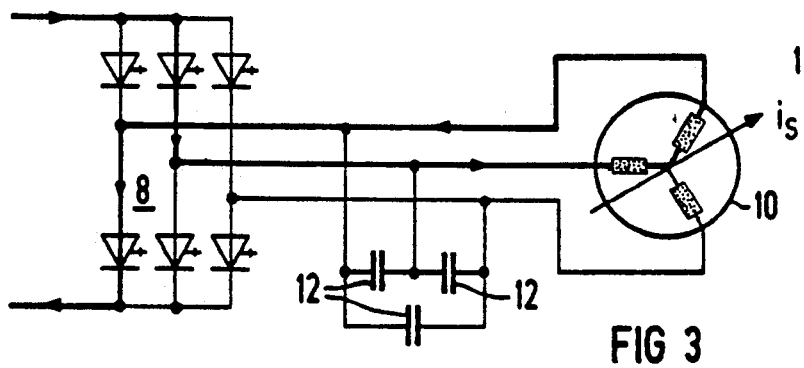
FIGS. 3 and 4 are circuit diagrams showing the current paths through a discrete-value final controlling element and the machine for one vector each.

Referring to FIG. 3, a first current path through the inverter 8 and the machine 10 for a switching which is shown as vector 1. If the current has flowed along this path for a sufficiently long period of time, the transient process has ended and the intermediate circuit current $i_{zw}$ only flows through the machine 10 and not through the capacitors 12. Because of the spacial arrangement of the machine windings, an unambiguous direction in vector space can be assigned to the machine current $i_s$.

Figure 4:
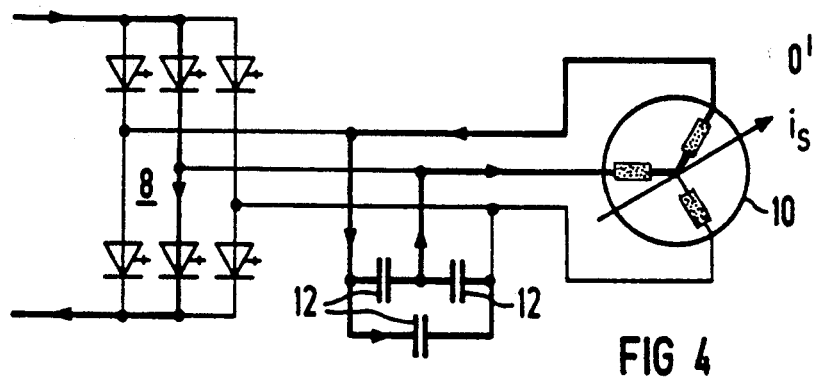

Now if, starting from this state, a switch to the center inverter valve is made in the bottom half of the bridge, the intermediate circuit current $i_{zw}$ flows past the machine 10 (i.e., bridge short circuit) and is designated as vector $O^I$. The machine current $i_s$ is maintained at first and finds a closed path via the capacitors 12 (see FIG. 4).

Figure 5:
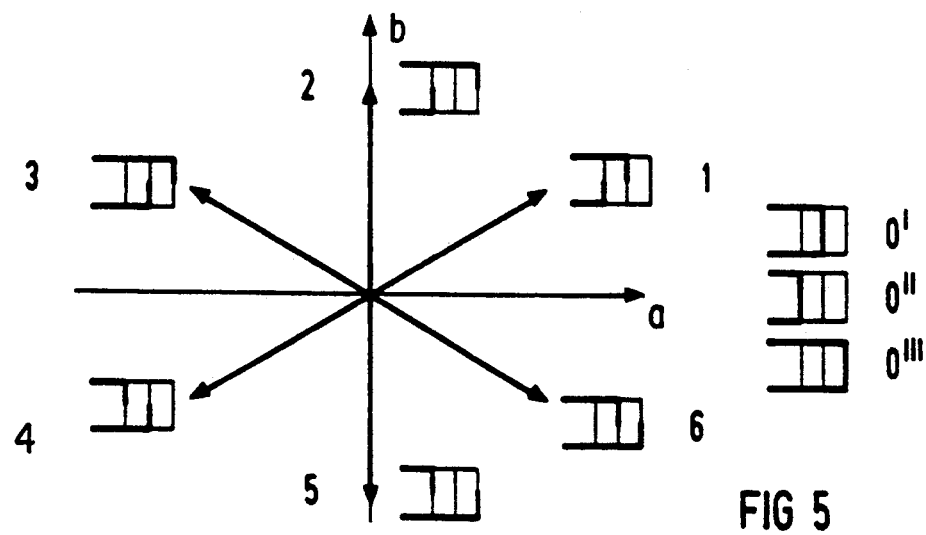
FIG. 5 is a vector diagram showing the possible switching settings and corresponding vectors of the machine side current converter of the circuit of FIG. 1.

Referring to FIG. 5, the directions of the current vectors for the different switching combinations and the current paths of the three possible bridge short circuits are shown. The current-carrying branches of the bridge of the inverter 8 are illustrated with a heavy line in each case. The magnitude of the vectors is determined by the magnitude of the intermediate circuit current $i_{zw}$, while the direction of the vectors is determined by the activated current converter valves of the inverter 8.

As described above, the method of the present invention for regulating a two-dimensional vector of a controlled system by a value-discrete final controlling element can also be used for a voltage impressing inverter, also called a pulse inverter.

As with the net-side inverter, the pulse inverter can have a diode bridge or a self-guided inverter. The machine-side inverter is a self-guided inverter with free-run diodes. As with the intermediate circuit, an electrolyte capacitor is provided. The related single-phase equivalent schematic would be similar to the equivalent schematic of FIG. 2. Instead of the current source 14, a voltage source having a subsequent series circuit, comprising a net resistor and a net inductance, would be provided. The switch 16 in the equivalent schematic of the pulse inverter is only a switch for opening and closing the circuit and not for switching over. In addition, a second switch would also be present, which would be arranged in front of the series circuit comprising a leakage inductance and a stator resistance.

Figure 6:
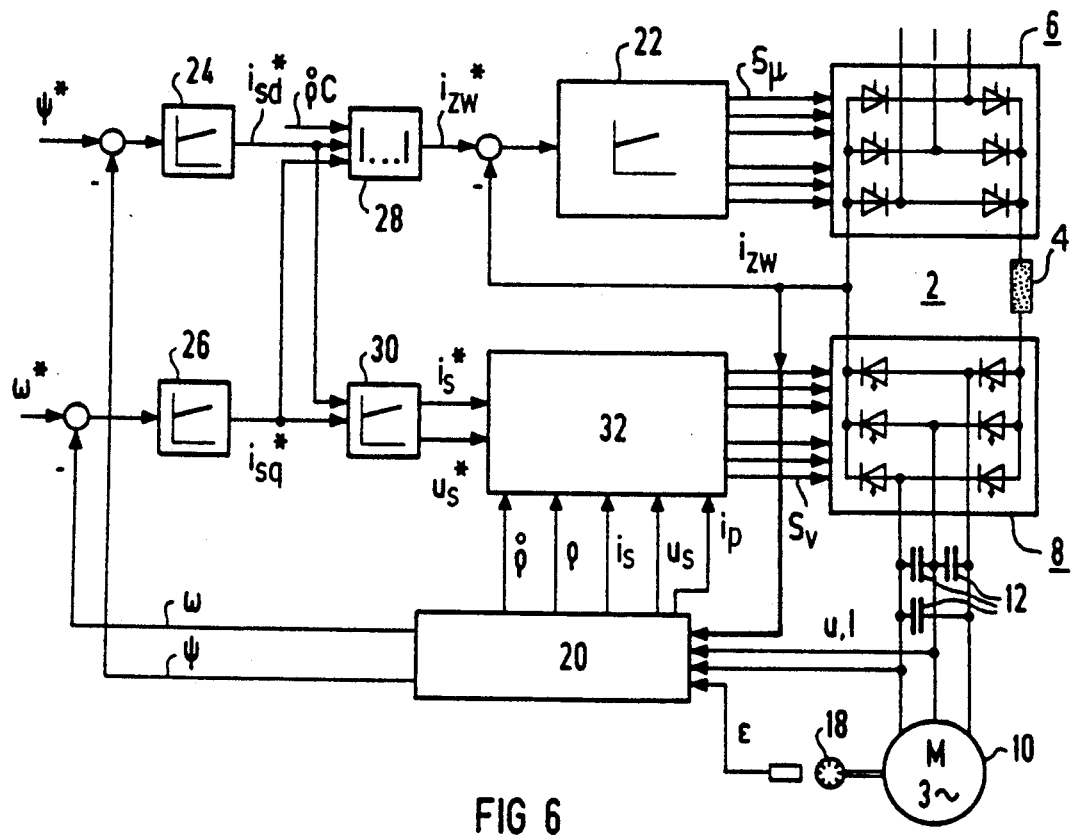
FIG. 6 is a simplified block diagram of the regulation circuitry for the circuit of FIG. 1.

Referring to FIG. 6, the drive of FIG. 1 having a regulation and control device is shown as a simplified block diagram. As with the current converter valves of the inverters 6 and 8, semiconductor valves which can be turned off are provided, particularly thyristors which can be shut off at high output, such as gate-turn-off thyristors (GTO thyristors). If GTO thyristors are used as the current converter valves, this intermediate circuit current converter 2 is also known as a GTO-I inverter. The load-side current converter 8 (value-discrete setting element), also called an inverter, is provided having capacitors 12 on the output side and supplies power to the machine 10, which can be provided with an R.P.M. transmitter 18.

The regulation and control device works with a current model 20 and the R.P.M. transmitter 18. A transmitter-free regulation having a voltage model can also be provided, but regulated operation at smaller revolutions per minute (less than 5 Hz) is no longer possible. Regulation of the net-side current converter 6 is of subordinate importance in the method according to the invention. The regulation of the net-side converter 6 is shown in FIG. 6 as a rectifier regulation circuit 22. In addition, the regulation and control device comprises a flow regulator 24, an R.P.M. regulator 26, a valve generator 28, a current regulator 30 and a switching arrangement 32 for implementing the method according to the invention.

The current model 20 generates an R.P.M. actual value $\omega$ and a flux actual value $\psi$ from the status actual values u and i of the machine 10. The current model 20 receives a determined rotor position $\epsilon$, and generates the status vectors $u_s$ and $i_s$, the angle $\rho$ of the flux $\psi$ and its angular velocity $\dot\rho$. To determine the derivations of the stator current vector $\dot u_s$, the inverter current $i_p$ of the load-side current converter B is also needed and is formed from the switching states $S_v$ and the intermediate circuit current $i_{zw}$. The flux regulator 24 generates a field-oriented current component reference value $i_{sd}^*$ of current $i_{zw}$ from a comparison of the flux reference value $\psi^*$ and the flux actual value $\psi$. The R.P.M. regulator 26 generates a field-oriented current component reference value $i_{sq}^*$ from a comparison of an R.P.M. reference value $\omega^*$ and the rpm actual value $\omega$. The value generator 28 determines the amount of the intermediate circuit current reference value $i_{zw}^*$, which is converted into control signals $S_\mu$ for the net-side current converter 6, from the two field-oriented current component reference values $i_{sd}^*$ and $i_{sq}^*$ and the angular velocity $\dot\rho$ of the flux $\psi$ multiplied by a Factor C. The field oriented current component reference values $i_{sd}^*$ and $i_{sq}^*$ are also supplied to the current regulator 30. The outputs of the current regulator 30 are the reference values $u_s^*$ and $i_s^*$ of the vectors $u_s$, $i_s$ of the segment 10, 12. The switching arrangement 32 for implementing the method of the present invention can be a microprocessor and generates the control and switching signals $S_v$ (switching states) for the machine-side current converter 8 from the reference values $u_s^*$, $i_s^*$ and the actual values $\rho$, $\dot\rho$, $i_s$, $u_s$ and $i_p$ generated by the current model 20. For a better understanding, the switching arrangement 32 is shown in greater detail in FIG. 7, as a hardware-type block schematic.

The method for using a U inverter (i.e., pulse inverter) is discussed below based on the block schematic of the switching arrangement 32 of FIG. 7 and the single-phase equivalent schematic of the intermediate circuit current inverter 2 with subsequent capacitors 12 and the machine 10 of FIG. 2.

For two-dimensional optimization (voltage with current as a secondary condition) there is only one variable (switching time point) available. In principle, six current vectors $i_{p1}$ to $i_{p6}$ are available, as well as three zero vectors $i_{p0}$I to $i_{p0}$III. These current vectors $i_p$I to $i_{p0}$III are shown in more detail in FIG. 9, in a rectangular stator-fixed coordinate system. Referring to FIG. 5, the matching possible switch settings of the machine-side final controlling element 8 are shown.

Figure 10:
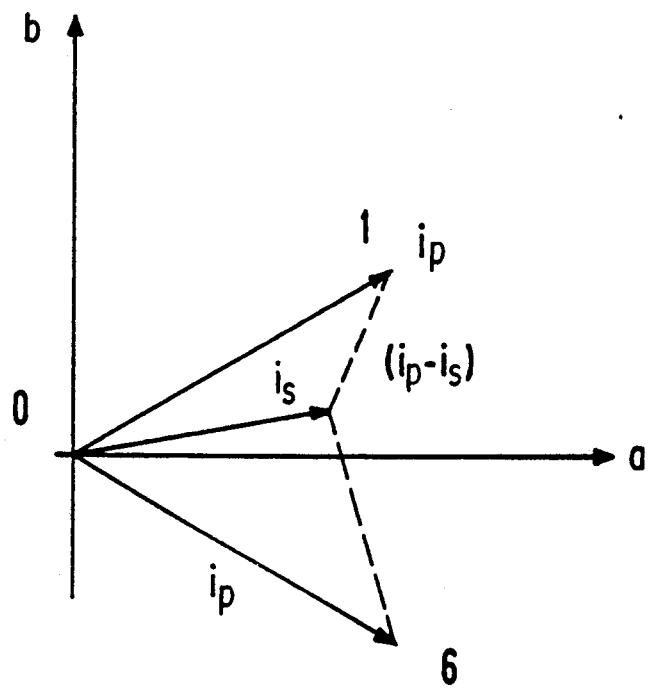
FIG. 10 is a vector diagram showing a machine current with its adjacent manipulated variable actual values.
Figure 11:
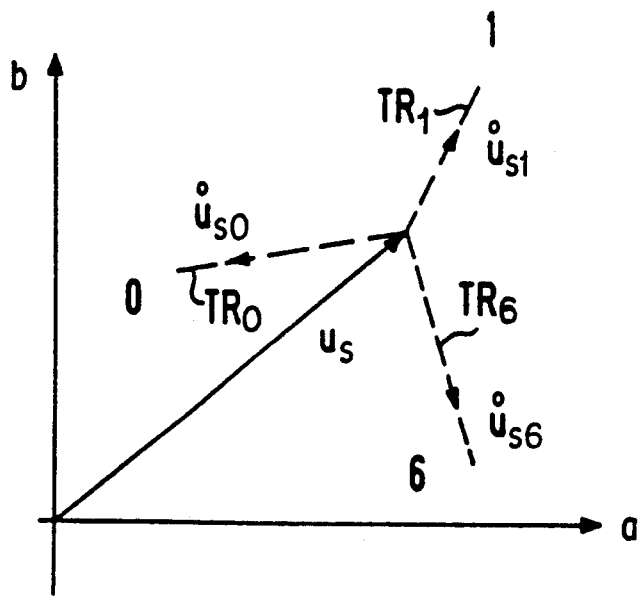
FIG. 11 is a vector diagram showing a voltage vector with its derivations.

Assuming that the stator current indicator $i_s$, as shown in FIG. 10, lies in a sector which is defined by the current indicators $i_{p6}$, $i_{p1}$ and $i_{p0}$, each of these three current indicators $i_{p6}$, $i_{p1}$ and $i_{p0}$ causes a movement (time change) $u_{s6}$, $u_{s1}$, and $u_{s0}$ of the voltage indicator $u_s$. This time change of the voltage indicator $u_s$ is proportional to the deviation $i_{p6}-i_s$, $i_{p1}-i_s$, and $i_{p0}-i_s$ of the current indicator $i_s$. The possible trajectories TR$_6$, TR$_1$, and TR$_0$ are shown as dashed lines in FIG. 11, each started from the tip of the voltage indicator $u_s$, by the selection of the three adjacent current indicators $i_{p6}$, $i_{p1}$ and $i_{p0}$. Since each of the three vectors $i_{p6}$, $i_{p1}$ and $i_{p0}$ causes a movement of the voltage vector $u_s$, the voltage vector $u_s$ (actual value) will equal, in the long run, the reference value $u_s^*$. Also, it is not necessary for the voltage vector $u_s$ to equal the reference value $u_s^*$, even at specific points in time. Rather, a reduction in harmonic oscillations is more important. To minimize the harmonic oscillations, the voltage indicator $u_s$ is kept as close as possible to a reference value $u_s^*$, but need not be exactly reached.

Figure 12:
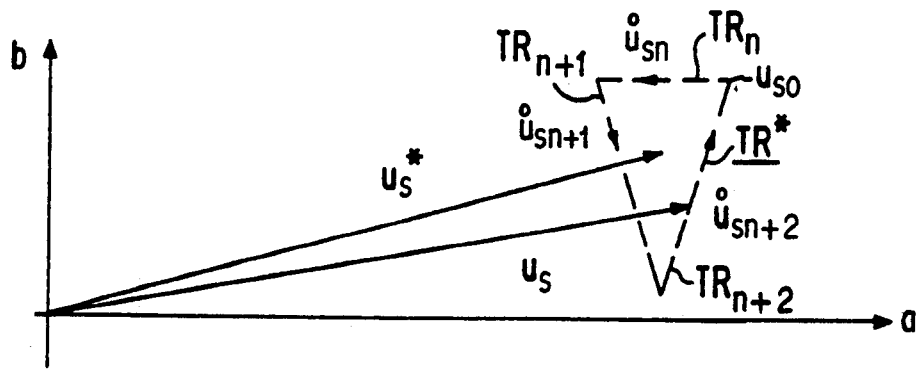
FIG. 12 is a vector diagram showing a reference trajectory of the stator voltage of the induction machine of FIG. 1.
Figure 13:
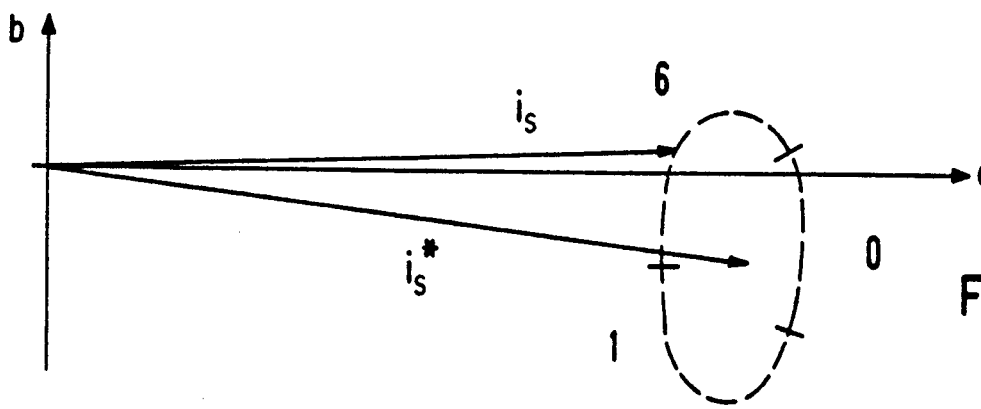
FIG. 13 is a vector diagram showing a trajectory of the machine current of the inverter-fed machine of FIG. 1.

The reference trajectory TR* of the voltage indicator $u_s$ with the smallest deviation at a given switching frequency $f_s$ of the final controlling element 8 is a triangle composed of the trajectories $TR_n$, $TR_{n+1}$ and $TR_{n+2}$ for three possible current vectors $i_{pn}$, $i_{pn+1}$ and $i_{pn+2}$. The vector triplet $i_{pn}$, $i_{pn+1}$ and $i_{pn+2}$ are adjacent indicators of an inverter current reference indicator $i_p^*$. This reference trajectory TR* of the voltage vector $u_s$ is shown in FIG. 12, in a rectangular stator-oriented coordinate system. The sequence of the current vectors and therefore the direction of passage should always be maintained and not changed after every period (which is usually done for known vector modulation with a voltage impressing pulse inverter). At no point in time will $u_s=u_s^*$. For this triangle, only three commutations are necessary for current impressing inverters, while four are needed for a voltage impressing inverter. As an ancillary condition, it is necessary that the current $i_s$ deviate as little as possible from the reference current $i_s^*$. In a progression of the voltage us pursuant to FIG. 12, a closed curve forms as the trajectory of the current $i_s$, represented in FIG. 13, if the integral over the voltage reference-actual difference over a pass becomes zero.

The following assumptions are made for the calculation of a switching time point:

There are three possible different current vectors $i_{pn}$, $i_{pn+1}$ and $i_{pn+2}$ available at every moment, $i_s$ is constant during a switching cycle, $i_s^*$, $u_s^*$ are constant values, $\omega$ is equal to zero.

If the last two assumptions are not true, the method of the present invention will still yield good results, since the switching time points are calculated continuously and switching actions that have yet to be carried out can be corrected. The method of the present invention rapidly adjusts to changed input variables.

In light of the description above, the requirements for effective operation are as follows:

a) The trajectory of $u_s$ (triangle shape of FIG. 12) is closed upon itself, b) the size of the triangle is limited and can be predetermined, c) the trajectory $i_s$ (oval shape of FIG. 13) is also closed upon itself.

If a voltage impressing inverter is used instead of the GTO-I inverter 2, the requirements for effective operation are as follows:

aa) The trajectory of $i_s$ (triangle shape of FIG. 12) is closed upon itself, bb) the size of the triangle is limited and can be predetermined, cc) the trajectory $u_s$ (oval shape of FIG. 13) is also closed upon itself.

Assuming that $T_n$, $T_{n+1}$ and $T_{n+2}$ are the interval times of the individual vectors $i_{pn}$, $i_{pn+1}$ and $i_{pn+2}$, or $u_{pn}$, $u_{pn+1}$ and $u_{pn+2}$, respectively, and $\dot{u}_{sn}$, $\dot{u}_{sn+1}$ and $\dot{u}_{sn+2}$, or $\dot{i}_{sn}$, $\dot{i}_{sn+1}$ and $\dot{i}_{sn+2}$ are the gradients of the stator voltage $u_s$ or the stator current $i_s$, respectively, for the different vectors $i_{pu}$ and $u_p$, respectively, then the following equations apply for the aforementioned requirements:

$$\int_{T_{ges}} \dot{u}_s \, dt = 0 \quad \text{(requirement a))} \tag{1}$$

$$T_n + T_{n+1} + T_{n+2} = T_{ges} \quad \text{(requirement b))} \tag{2}$$

$$\int_{T_{ges}} (u_s - u_s^*) \, dt = 0 \quad \text{(requirement c))} \tag{3}$$

or $$\int_{T_{ges}} \dot{i}_s \, dt = 0 \quad \text{(requirement aa))} \tag{1.1}$$

$$T_n + T_{n+1} + T_{n+2} = T_{ges} \quad \text{(requirement bb))} \tag{2.2}$$

$$\int_{T_{ges}} (i_s - i_s^*) \, dt = 0 \quad \text{(requirement cc))} \tag{3.3}$$

Assuming that $i_s$ is a constant value or that $u_s$ is a constant value in the interval $T_{ges}$ (switching period), a third order equation system is obtained from equations (1) and (2), or (1.1) and (2.2), respectively:

$$\begin{bmatrix} \dot{u}_{sn} & \dot{u}_{sn+1} & \dot{u}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix} \tag{4}$$

or $$\begin{bmatrix} \dot{i}_{sn} & \dot{i}_{sn+1} & \dot{i}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix} \tag{4.4}$$

The shape and the size of the triangle are determined by this equation system, but the location is not yet determined. If a corner point of the triangle is designated as $u_{so}$ or $i_{so}$ (see FIG. 12) then the following equations apply for the voltage vector $u_s$ or the current vector $i_s$, respectively, during a switching period $T_{ges}$:

$$u_s(t) = \begin{cases} u_{so} + \dot{u}_{sn} t & t_o \leq t < t_o + T_n \\ u_{so} + \dot{u}_{sn} T_n + \dot{u}_{sn+1}(t - T_n) & t_o + T_n \leq t < t_o + T_n + T_{n+1} \\ u_{so} + \dot{u}_{sn} T_n + \dot{u}_{sn+1} T_{n+1} + \dot{u}_{sn+2}(t - T_n - T_{n+1}) & t_o + T_n + T_{n+1} \leq t < t_o + T_{ges} \end{cases} \tag{5}$$

$$i_s(t) = \begin{cases} i_{so} + \dot{i}_{sn} t & t_o \leq t < t_o + T_n \\ i_{so} + \dot{i}_{sn} T_n + \dot{i}_{sn+1}(t - T_n) & t_o + T_n \leq t < t_o + T_n + T_{n+1} \\ i_{so} + \dot{i}_{sn} T_n + \dot{i}_{sn+1} T_{n+1} + \dot{i}_{sn+2}(t - T_n - T_{n+1}) & t_o + T_n + T_{n+1} \leq t < t_o + T_{ges} \end{cases} \tag{5.5}$$

If equation (5) or (5.5), is inserted into equation (3) or (3.3), respectively, the following equation results from integration, and is resolved for the corner point $u_{so}$ or $i_{so}$, respectively, which is being sought.

$$(u_{so} - u_s)T_{ges} + \dot{u}_{sn}\left(\frac{T_n^2}{2} + T_nT_{n+1} + T_nT_{n+2}\right) + \qquad (6)$$

$$\dot{u}_{sn+1}\left(\frac{T_{n+1}^2}{2} + T_{n+1}T_{n+2}\right) + \dot{u}_{sn+2}\frac{T_{n+2}^2}{2} = 0$$

$$(i_{so} - i_s)T_{ges} + \dot{i}_{sn}\left(\frac{T_n^2}{2} + T_nT_{n+1} + T_nT_{n+2}\right) + \qquad (6.6)$$

$$\dot{i}_{sn+1}\left(\frac{T_{n+1}^2}{2} + T_{n+1}T_{n+2}\right) + \dot{i}_{sn+2}\frac{T_{n+2}^2}{2} = 0$$

In these equations it was assumed that the reference value $u_s^*$ of the voltage indicator or the reference value $i_s^*$ of the current indicator, respectively, not change at the pulse inverter during the switching period $T_{ges}$. In that case, however, and it the derivation $\dot{u}_s^*$ is known, $u_s$ has to be replaced with $(\dot{u}_s - \dot{u}_s^*)$.

In general, the voltage regulator $u_s$ or the current indicator $i_s$ does not lie on the reference trajectory TR* calculated in this way, but mostly in close proximity to it. With a suitable method, the voltage vector $u_s$ or the current indicator $i_s$ is made to run into this optimum cycle (reference trajectory TR*).

This is achieved by selecting the switching time points in such a way so that the distance between the voltage vector $u_s$ or the current vector $i_s$ and the nearest corner point $u_{so}$ or $i_{so}$ to the switching time point is at a minimum. The following equations apply:

$$|u_s(t) - u_{so}|^2\Big|_{t=t_s} = \min \qquad (7)$$

or $$|i_s(t) - i_{so}|^2\Big|_{t=t_s} = \min \qquad (7.7)$$

To solve equation (7) or (7.7), the time progression of the stator voltage $u_s$ or the stator current $i_s$ is approximated for the instantaneous time point $T_0$ by a Taylor series, and the higher order terms are ignored. The leakage of the voltage is known from the capacitor equation $$\dot{u}_s = 1/C(i_p - i_s).$$

While the derivation of the current is known for the U inverter from the stator equation $$\dot{i}_s = \frac{1}{\sigma L_s}(u_s - R_s i_s - u_i).$$

Figure 14:
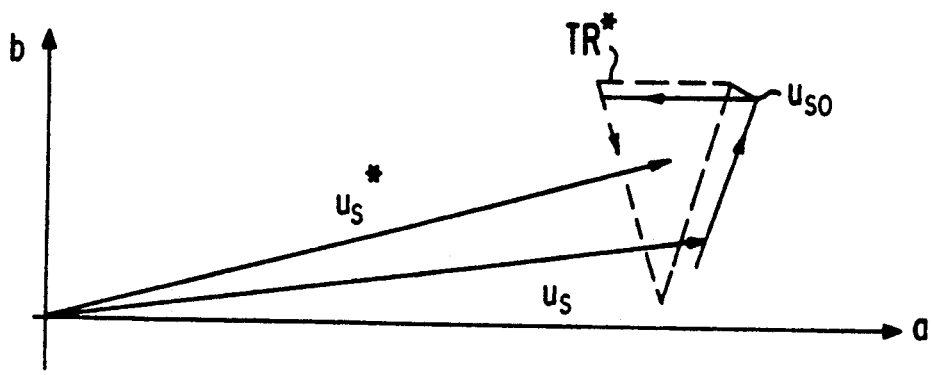
FIG. 14 is a vector diagram illustrating the entry of the stator voltage vector into a reference trajectory.

With the orthogonal components of the stator voltage $u_{s1}$ and $u_{s2}$ or the stator current $i_{s1}$ and $i_{s2}$, the computation in Equation (7) or (7.7), respectively, can now be resolved. The minimum then lies at the point at which the derivation becomes zero. Finally, an equation of the first order is obtained, with the solution:

$$(t_s - t_o) = \frac{\dot{u}_{s1}(u_{so1} - u_{s1}(t_o)) + \dot{u}_{s2}(u_{so2} - u_{s2}(t_o))}{\dot{u}_{s1}^2 + \dot{u}_{s2}^2} \qquad (8)$$

or $$(t_s - t_o) = \frac{\dot{i}_{s1}(i_{so1} - i_{s1}(t_o)) + \dot{i}_{s2}(i_{so2} - i_{s2}(t_o))}{\dot{i}_{s1}^2 + \dot{i}_{s2}^2} \qquad (8.8)$$

and the time difference remains until the next switching point. In FIG. 14, the voltage indicator $u_s$ is shown to run into the reference trajectory TR*.

If $\omega = 0$, the reference trajectory TR* constantly deforms, and the trajectory segments are no longer straight lines. Since the trajectory is constantly being recalculated and only the corner point of the triangle at $u_{s0}$ is important, these deformations do not result in any problems. Slight deviations occur only if the switching frequency $f_s$ becomes small in relation to $\omega$ R.P.M.

Deviations in the voltage vector $u_s$ from the straight line segments $TR_n$, $TR_{n+1}$ and $TR_{n+2}$ also occur due to the movement of the current vector $i_s$ in the GTO-I inverter due to the switching actions (harmonic oscillations). This effect can be circumvented by using the reference values (corresponding to the time mean of the current) for the calculation of the derivations $\dot{u}_{sn}$, $\dot{u}_{sn+1}$ and $\dot{u}_{sn+2}$, rather than the actual current values.

In this manner, not only is the switching time point calculation independent of harmonic oscillations, but also, behavior similar to $PT_1$ is obtained for the current, without an external regulator being present.

Figure 15:
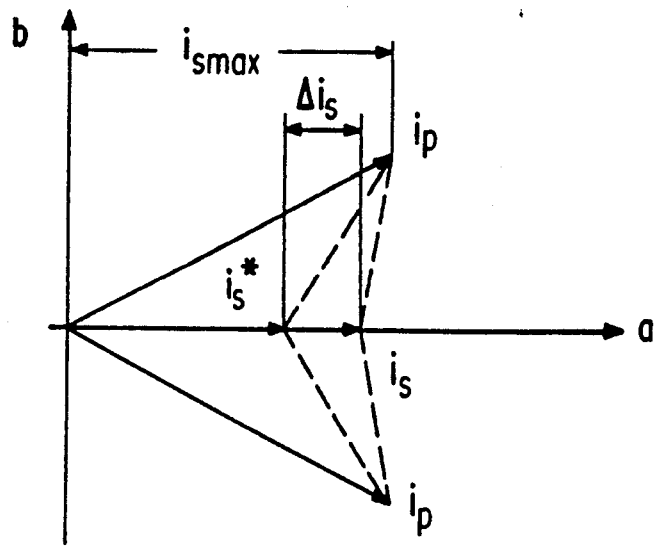
FIG. 15 is a vector diagram showing the selected current vectors at a significant deviation of the machine current from the reference value.

Referring to FIG. 15, a situation where the actual current vector $i_s$ deviates significantly from the reference value $i_s^*$ is shown. By using the reference vector, a reference trajectory TR* is calculated for the voltage indicator $u_s$, through which the voltage indicator $u_s$ cannot pass (represented in FIG. 16). On the basis of the switching condition, the center point of the true trajectory TR according to FIG. 16 lies offset from the reference value $u_s^*$ in such a way that a voltage time area $\Delta u_{II}$ is formed, which drives the current $i_s$ in the direction of the reference current $i_s^*$.

Figure 16:
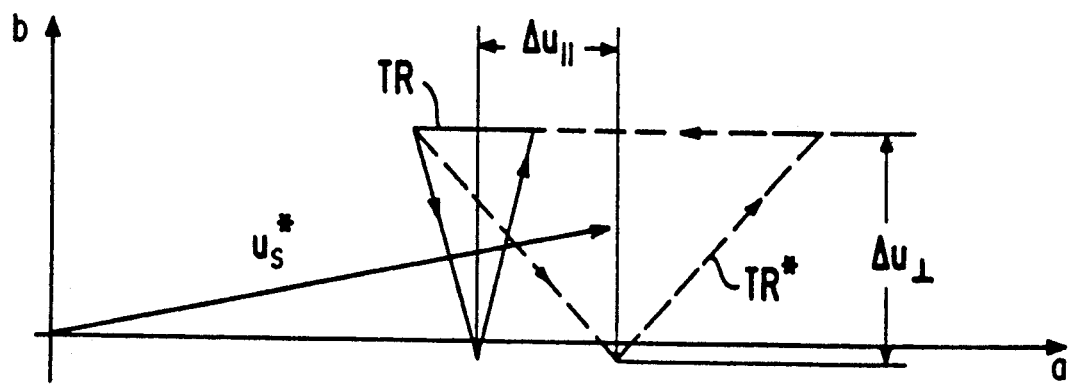
FIG. 16 is a vector diagram showing the related movement of the voltage vector of FIG. 15.

To estimate the behavior over time, the following equation is obtained from geometrical considerations and with the designations from FIGS. 15 and 16:

$$\frac{\Delta u_{||}}{\Delta u_{\perp}} \approx \frac{\Delta i_s \sqrt{3}}{i_{smax}} \qquad (9)$$

From the stator differential equation, the following equation is obtained by approximation:

$$\Delta u_{II} = \sigma L_3 \Delta \dot{i}_3 \qquad (10)$$

and thus inserting $$\Delta \dot{i}_3 = -k\Delta i_3 \qquad (11)$$

into $$k = \frac{\Delta u_{\perp} \sqrt{3}}{\sigma L_s i_{s,max}} \qquad (12)$$

The equation (11) describes a differential equation of the first order with a negative, purely real pole ($PT_1$ behavior).

A suitable regulator for the current is therefore only necessary in order to eliminate stationary interference (e.g. in case of incorrectly set parameters or to improve the dynamics).

Essentially, the following three equations must be solved:
- Equation (4) or (4.4), in order to determine the proportional times of the three vectors,
- Equation (6) or (6.6), for the corner point of the reference trajectory TR*,
- Equation (8) or (8.8), which reproduces the remaining time $t_s$ until the switching point.

All three equations (4), (6) and (8) or (4.4), (6.6) and (8.8), respectively, can be solved purely by mathematics. However, as an ancillary condition, it is required that all time intervals are positive.

$$(t_s - t_0), T_n, T_{n+1}, T_{n+2} > 0$$

If the equation (8) or (8.8) yields a negative solution, the optimum switching time point has already occurred. This can occur, for example, because of reference value changes. Immediate switching is still the best solution.

Figure 17:
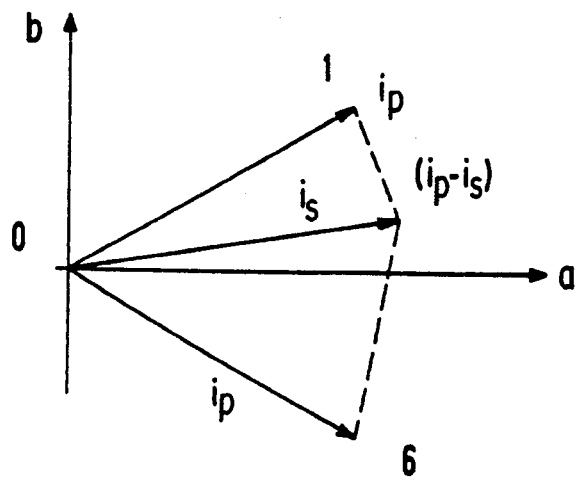
FIG. 17 is a vector diagram showing a stator current with its adjacent manipulated variable actual values, where the stator current lies outside a spread hexagon area.
Figure 18:
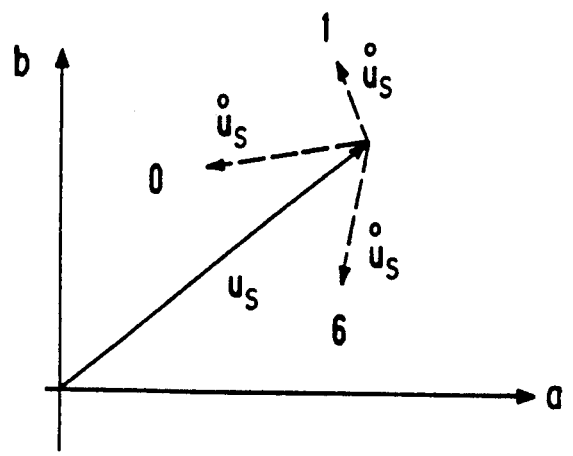
FIG. 18 is a vector diagram showing a related voltage vector with its derivations.

Equation (6) or (6.6) always yields a useful solution if the time intervals $T_n$, $T_{n+1}$, $T_{n+2}$ are positive. It is not always certain that these time intervals are all positive. If, for example, the intermediate circuit current $i_{zw}$ is too small, the stator current vector $i_s$ no longer lies within the triangle formed by the possible vectors $i_{p1}$, $i_{p0}$ and $i_{p6}$ (FIG. 17). The stator voltage $u_s$ can therefore no longer be influenced in every direction, (see FIG. 18). In the indicator diagram according to FIG. 18, an increase in the voltage $u_s$ in the direction of the positive a-axis is no longer possible. A closed triangle as the local curve of the stator voltage $u_s$ of FIG. 12 can only be achieved with a negative time (in this case, the time for the vector 0). This is not a logical result, and the equations have to be modified.

The vector, which was evaluated with a negative time (in this case, the vector 0), is left out and no longer used for the calculation of the switching times. An influence in the direction perpendicular to the connection line of the remaining vectors $i_{p1}$ and $i_{p6}$ can no longer be achieved. It is satisfactory to correctly set only the proportion of the reference current tangential to the connection line. All variables for calculating the switching time points are therefore projected onto this connection line, and only one dimension remains.

Figure 19:
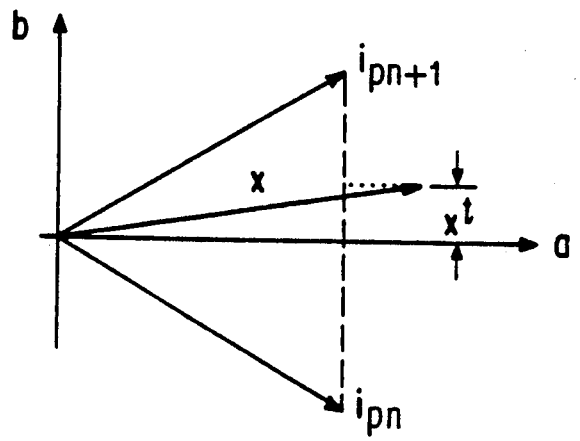
FIG. 19 is a vector diagram showing the projection of a vector x with a limited vector selection.

Assuming $x^t$ is the projection of the variable x onto the connection line of the vectors $i_{pn}$ and $i_{pn+1}$, then the following equation applies according to FIG. 19:

$$x^t = \frac{Re\{\bar{x}(i_{pn} - i_{pn+1})\}}{|(i_{pn} - i_{pn+1})|} \quad (13)$$

With this, the equation for the proportional time according to Equation (4) becomes a system of the second order:

$$\begin{bmatrix} \dot{u}^t_{sn} & \dot{u}^t_{sn+1} \\ 1 & 1 \end{bmatrix} \begin{bmatrix} T_n \\ T_{n+1} \end{bmatrix} = \begin{bmatrix} 0 \\ T_{ges} \end{bmatrix} \quad (14)$$

The next corner point of the reference trajectory, which is not one-dimensional, is obtained from:

$$(u^t_{so} + \dot{u}^t_s)T_{ges} + \ddot{u}^t_{sn}\left(\frac{T_n^2}{2} + T_n T_{n+1}\right) + \ddot{u}^t_{sn+1}\left(\frac{T_{n+1}^2}{2}\right) = 0 \quad (15)$$

The remaining time until the next switch can therefore be calculated immediately:

$$(t_s - t_0) = \frac{u^t_{so} - u^t_s(t_0)}{\dot{u}^t_{sn}} \quad (16)$$

With this, it is possible to continuously generate correct switching times, but with the limitation that no influence exists any longer on the component perpendicular to the connection line of the possible current vectors $i_{pn}$ and $i_{pn+1}$.

In general, three vectors are used for calculating the switching time. It is necessary to determine which of the seven possibilities (FIG. 9) are the correct ones.

Figure 9:
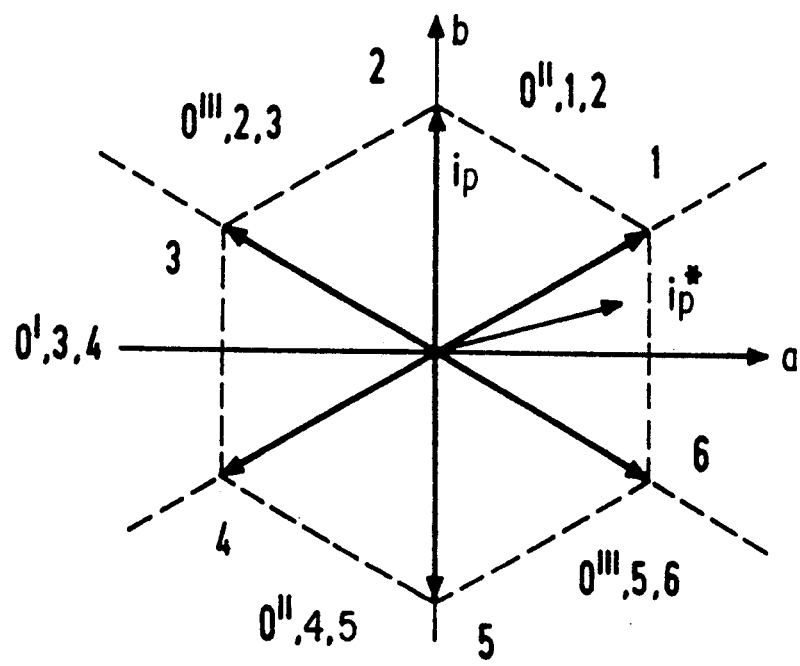
FIG. 9 is a vector diagram of the possible input current vectors of the discrete-value setting element of FIG. 1.

In order to generate as few harmonic oscillations as possible at a given switching frequency $f_s$, the vectors which produce the least possible deviation from the reference value should always be selected, in other words, the vectors which lie the closest to the reference inverter current $i_p^*$ (FIG. 9). The following equation applies:

$$i_p^* = i_s^* + j\dot{p}C u_s^*.$$

However, it should also be ensured that no unnecessary switching actions occur during the transition between two vector triplets. Only a transition between adjacent sectors is logical, and only if the vector $i_p$, which connects adjacent sectors and is contained in both vector triplets, is switched on at that particular time. The zero vector cannot be viewed as a common vector contained in both vector triplets, since there are three different switching variants for it according to FIG. 5, and only one of them is logical in each sector, and adjacent sectors do not possess a common zero vector. It is shown in FIG. 9 that for a predetermined vector $i_p^*$, only the three adjacent vectors $i_{p1}$, $i_{p6}$ and $i_{p0}$I are logical, since they have the smallest distance from the reference vector $i_p^*$.

The sequence or the passage direction through the selected vector triplet remains as another degree of freedom in the determination of the switching time points.

Figure 20:
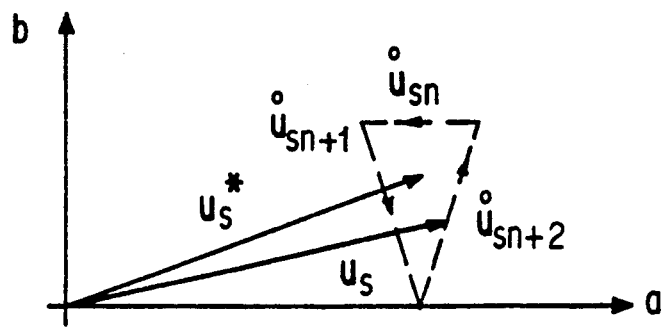
FIG. 20 and 21 are vector diagrams representing different pass directions of vector triplets.
Figure 21:
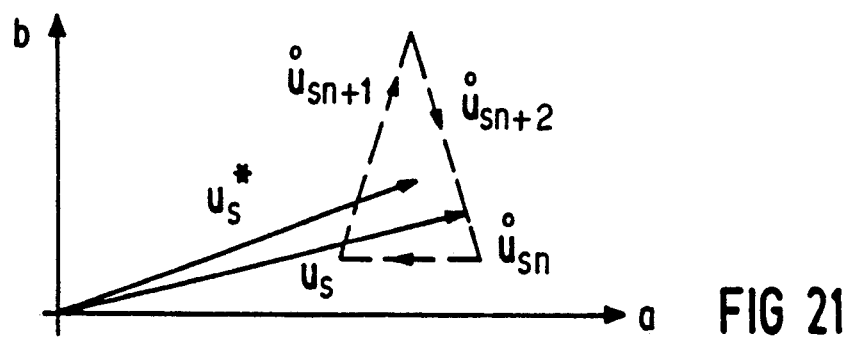

From the three different directions of the derivation of the stator voltage $\dot{u}_{sn}$, $\dot{u}_{sn+1}$ and $\dot{u}_{sn+2}$, a triangle is constructed as the local curve of the stator voltage $u_s$. However, with the same mean value and the same content of harmonic oscillations, there are two orientations for the triangle, depending on the sequence of passage through the vector triplet. FIGS. 20 and 21 show two different possibilities.

As mentioned above, it does not matter at all what sequence is selected, but it should be kept the same. As soon as a new vector triplet is selected, however, or if the reference values change, it may be better to change the sequence. A decision then has to be made as to what sequence fits the given initial values better.

When passing through the triangle in the mathematically positive direction, represented in FIG. 20, the reference value $u_s^*$ always lies to the left of the trajectory TR*, while it lies to the right otherwise, as shown in FIG. 21. At a given voltage $u_s$ it can therefore be immediately determined which sequence is better. The following equations apply:

$$(u_s - u_s^*) \odot \dot{u}_s \begin{cases} > 0 = \text{positive direction} \\ < 0 = \text{negative direction} \end{cases} \quad (17)$$

with the operator $\odot$ defined as:

$$x \odot y = x_1 \cdot y_2 - x_2 \cdot y_1 \quad (18)$$

It has been assumed until now that all of the switching times can be implemented from the calculation. In fact, this cannot always be achieved. Difficulties occur at three points:

When the reference value changes.

Due to the minimum switch-on and switch-off times of the semiconductor elements.

Due to the time-discrete method of operation of the processor.

Figure 22:
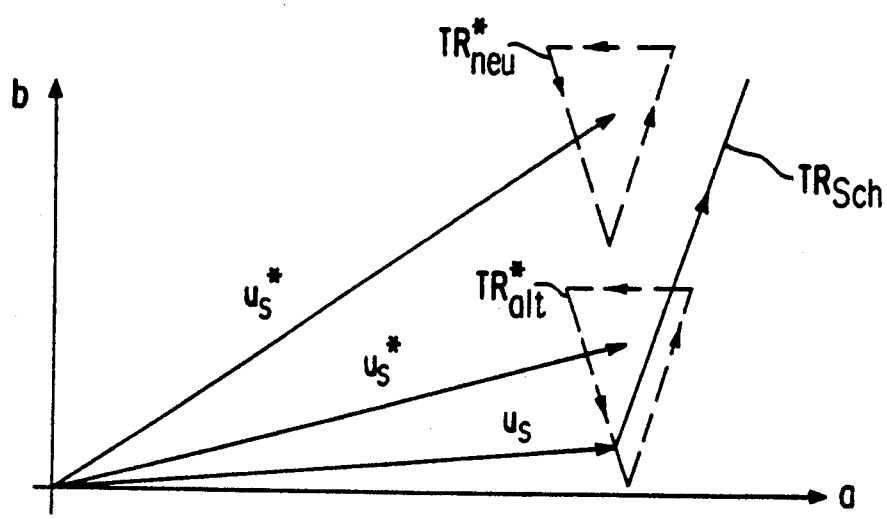
FIG. 22 is a vector diagram showing the behavior of the voltage vector when the reference value changes.

If the reference value $u_s^*$ of the voltage changes suddenly, the reference vector $u_s^*$ may no longer lie within the calculated reference trajectory $TR_{alt}^*$ of the voltage $u_s$. Also, the actual vector $u_s$ may move away from the reference value $u_s^*$, as seen in FIG. 22. In this case, a negative time difference until the next switching point is calculated. The best alternative, in this case, is to carry out the switching action immediately. This is represented by a trajectory $TR_{Sch}$. This variation results automatically, since equation (8) yields a negative time, which can only be approximated by switching immediately.

In order not to destroy the current converter valves of the setting element 8 which can be turned off, the minimum switch-on and switch-off times must be observed. Otherwise the components are unevenly stressed by current constrictions and can become too hot. The minimum switch-on time is in the range between 20 and 200 μsec, depending on the model and circuitry. As a minimum switch-off time, the double value can be assumed. Since the inverter currents $i_p$ are not measured, but are taken into consideration for regulation, the minimum times cannot be monitored only by the hardware, but rather, this limitation must also be reproduced in the processor, and the changed switching times have to be output to the control set and included in the further calculations.

Figure 23:
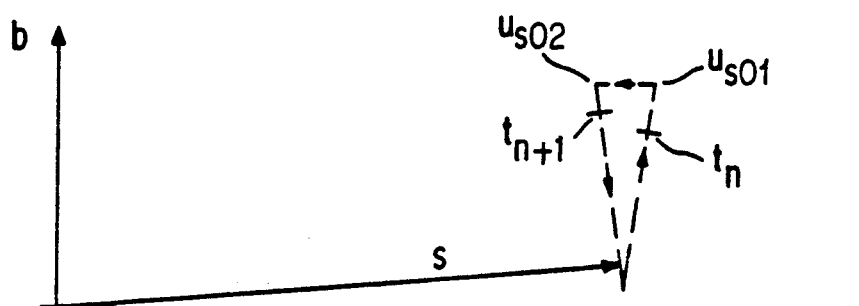
FIG. 23 is a vector diagram showing a voltage local curve at short pulses.

It was assumed until now that the calculation of the switching time points is carried out at infinite speed and that the switching times are always available. Due to the discrete method of operation of the processor and the finite scanning time, only one switching time point is calculated in each scanning interval. If the difference between two switching time points is less than the scanning time, at least two switching time points have to be calculated in a scanning interval $t_{n+1} - t_n$ (FIG. 23), even if these are not always implemented in the next scanning interval. Therefore, a two-stage calculation with the following sequence is necessary:

Calculation of the first switching time point as described.

Consideration of the minimum switching times.

Estimation of the capacitor voltage at this time point, utilizing the previous results.

Calculation of the reference value of the capacitor voltage at the next switching time point as in the first calculation.

Calculation of the time difference until the switching point.

Consideration of the minimum switching times.

As long as the scanning frequency is at least twice as high as the switching frequency $f_s$, good results are obtained with this two-stage advance calculation. At smaller scanning frequencies, however, additional calculation steps have to be added. With this extrapolation into the future, the uncertainty with regard to external influences increases.

Figure 7:
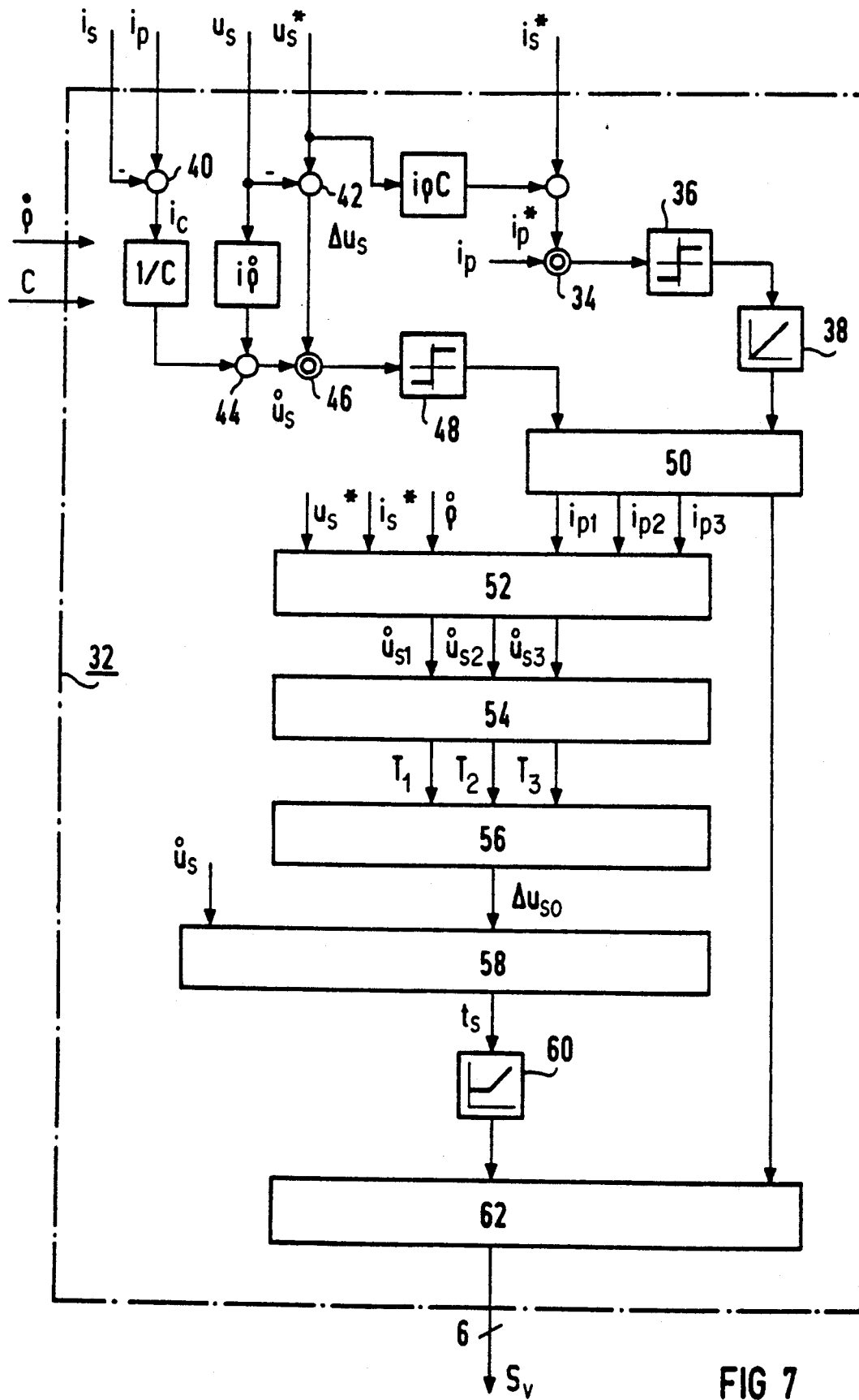
FIG. 7 is a hardware-type block schematic illustrating the method of the present invention.

As mentioned above, the method of the present invention for regulating a two-dimensional vector $u_s$, a controlled system 10, 12 by means of a value-discrete final controlling element 8 with a limited switching frequency $f_s$ is represented in greater detail in FIG. 7, as a hardware-type block schematic. The single-phase equivalent schematic of FIG. 2 has been used as the basis for the circuit of FIG. 7. The switching arrangement 32 calculates a corresponding sector, in which the reference value of the inverter current $i_p^*$ is found, from the input variables $u_s^*$, $i_s^*$ and $i_p$ with a scalar operator 34, defined in Equation (18), a comparator 36 and a sector counter 38. With the other input variables $i_s$, $i_p$, $u_s$, $u_s^*$, $\dot{p}$, and C of this switching arrangement 32, in combination with comparators 40 and 42, an adder 44, a scalar operator 46 and a comparator 48, the sequence of a vector triplet $i_{p1}$, $i_{p2}$ and $i_{p3}$ selected by block 50 is determined. With the vector triplet $i_{p1}$, $i_{p2}$ and $i_{p3}$, and the input variables $u_s^*$, $i_s^*$ and $\dot{p}$, three voltage gradients $\dot{u}_{s1}$, $\dot{u}_{s2}$ and $\dot{u}_{s3}$ are calculated, illustrated by block 52. With these voltage gradients $\dot{u}_{s1}$, $\dot{u}_{s2}$ and $\dot{u}_{s3}$ and equation (4), illustrated by a block 54, the interval times of the individual current indicators $i_{p1}$, $i_{p2}$ and $i_{p3}$ of the selected vector triplet are obtained. With these interval times $T_1$, $T_2$ and $T_3$ as determined, and the equation (6), embodied by the block 56, the location of the reference trajectory $TR^*$ is determined (i.e. a corner point $u_{so}$ or $\Delta u_{so}$ is determined). The switching time point must be selected in such a way that the distance between the voltage vector $u_s$ and the nearest corner point $u_{so}$ to the switching point becomes minimal so that a voltage vector $u_s$ runs into the reference trajectory $TR^*$. With equation (8), embodied by the block 58 and the corner point $u_{so}$ and a voltage gradient $\dot{u}_s$, the remaining time $t_s$ until the next switching point is obtained. This time $t_s$ is passed on to a control set 62, as well as a sector number by a gate 60, which includes the minimum switching time of a current converter valve, which can be turned off, of the final controlling element 8. A hardware embodiment of the control set 62 is shown in greater detail in FIG. 8. At the outputs of the control set 62, the switching states $S_v$ for the setting element 8 are present.

Figure 8:
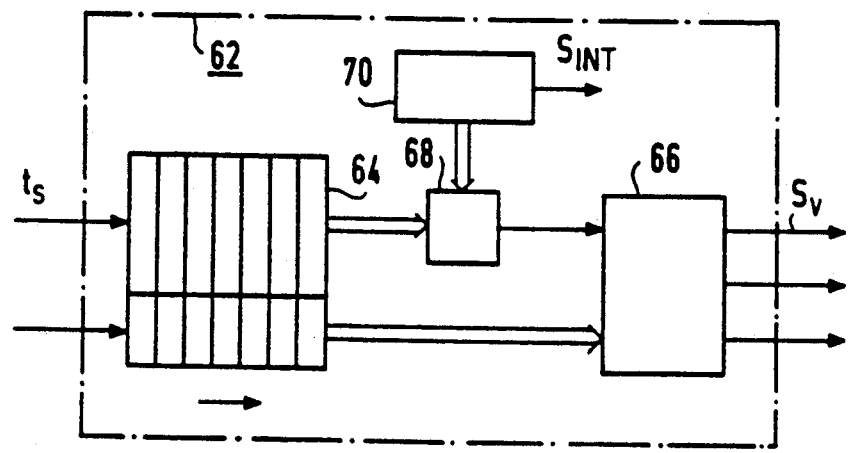
FIG. 8 is a block diagram of a control set.

The control set according to FIG. 8 comprises a shift register 64 at its input, where a sector number and a time $t_s$ are continuously read in, and a transfer register 66 at its output. The sector numbers are passed to the transfer register 66 directly, where the time $t_s$ is passed to a comparator 68, the other output of which is connected with a counter 70. The counter 70 is set for a scanning time $t_n$. If this counter status is reached, an interrupt signal $S_{INT}$ is generated. If the remaining time $t_s$ is greater tan the set scanning time $t_n$, this time $t_s$ is not passed on to the transfer register 66.

The method of the present invention and the switching arrangement 32 for implementing the method have the following advantages:

The capacitor voltage $u_s$ is kept as close as possible to the reference value $u_s^*$.

No resonances are excited, and existing oscillations are quickly regulated.

The necessary machine current $i_s$ is already set correctly by the modulation.

The harmonic oscillations are minimized.

The adjustment time for the voltage $u_s$ and current $i_s$ is extremely short.

The regulation strongly prevents parameter changes and marginal conditions of the inverter.

What is claimed is:

1. A method for processing reference value vectors of a two-dimensional vector of a controlled system for switch signals for a discrete value final controlling element during a switching period, said controlling element outputting a current vector as a function of a plurality of discrete switch combinations, each of said switch combinations representing a discrete current actual-value vector, the method comprising:
   determining an inverter current reference indicator of said controlling element from the reference value vectors of said controlled system;
   selecting a vector triplet of discrete current actual-value vectors as a function of said current vector of said controlling element, said vector triplet defining and spanning a sector in which said inverter current reference indicator of said controlling element resides;
   computing three voltage gradients from said vector triplet, said reference value vectors of the two-dimensional vector of said controlled system, and an angular speed of a flux of said controlled system;
   determining a dwell time for each of said discrete current actual-value vectors in said vector triplet;
   determining a corner point of a reference trajectory of a reference value vector of the two-dimensional vector of said controlled system as a function of said voltage gradients and said dwell times for said discrete current actual-value vectors in said vector triplet;
   determining remaining time from one corner point to a next switching point as a function of said voltage gradient;
   converting said remaining time into a switch signal as a function of said sector defined by said vector triplet, said switch signal setting a discrete switch combination in said controlling element.

2. The method of claim 1 wherein said interval times are calculated such that an integral of a difference between the two-dimensional vector and the reference-value vector is zero over the switching period.

3. The method of claim 1 wherein the interval times are determined according to the following equation system.

$$\begin{bmatrix} \dot{y}_{sn} & \dot{y}_{sn+1} & \dot{y}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}.$$

4. The method of claim 1 wherein said interval times are determined according to the following equation system.

$$\begin{bmatrix} \dot{u}_{sn} & \dot{u}_{sn+1} & \dot{u}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}.$$

5. The method of claim 1, wherein said interval times are determined according to the following equation system.

$$\begin{bmatrix} \dot{i}_{sn} & \dot{i}_{sn+1} & \dot{i}_{sn+2} \\ 1 & 1 & 1 \end{bmatrix} \begin{bmatrix} T_n \\ T_{n+1} \\ T_{n+2} \end{bmatrix} = \begin{bmatrix} 0 \\ T_{ges} \end{bmatrix}.$$

6. The method of claim 1 wherein a corner point of said reference trajectory is determined according to the following equation.

$$(y_{so} - y_s)T_{ges} + \dot{y}_{sn}\left(\frac{T_n^2}{2} + T_n T_{n+1} + T_n T_{n+2}\right) + \dot{y}_{sn+1}\left(\frac{T_{n+1}^2}{2} + T_{n+1}T_{n+2}\right) + \dot{y}_{sn+2}\frac{T_{n+2}^2}{2} = 0.$$

7. The method of claim 1 wherein a corner point of said reference trajectory is determined according to the following equation.

$$(u_{so} - u_s)T_{ges} + \dot{u}_{sn}\left(\frac{T_n^2}{2} + T_n T_{n+1} + T_n T_{n+2}\right) + \dot{u}_{sn+1}\left(\frac{T_{n+1}^2}{2} + T_{n+1}T_{n+2}\right) + \dot{u}_{sn+2}\frac{T_{n+2}^2}{2} = 0.$$

8. The method of claim 1 wherein a corner point of said reference trajectory is determined according to the following equation.

$$(i_{so} - i_s)T_{ges} + \dot{i}_{sn}\left(\frac{T_n^2}{2} + T_n T_{n+1} + T_n T_{n+2}\right) + \dot{i}_{sn+1}\left(\frac{T_{n+1}^2}{2} + T_{n+1}T_{n+2}\right) + \dot{i}_{sn+2}\frac{T_{n+2}^2}{2} = 0.$$

9. The method of claim 1 wherein an amount of time remaining before a next corner point is determined according to the following equation.

$$(t_s - t_o) = \frac{\dot{y}_{s1}(y_{so1} - y_{s1}(t_o)) + \dot{y}_{s2}(y_{so2} - y_{s2}(t_o))}{\dot{y}_{s1}^2 + \dot{y}_{s2}^2}.$$

10. The method of claim 1 wherein an amount of time remaining before a next corner point is determined according to the following equation.

$$(t_s - t_o) = \frac{\dot{u}_{s1}(u_{so1} - u_{s1}(t_o)) + \dot{u}_{s2}(u_{so2} - u_{s2}(t_o))}{\dot{u}_{s1}^2 + \dot{u}_{s2}^2}.$$

11. The method of claim 1 wherein an amount of time remaining before a next corner point is determined according to the following equation.

$$(t_s - t_o) = \frac{\dot{i}_{s1}(i_{so1} - i_{s1}(t_o)) + \dot{i}_{s2}(i_{so2} - i_{s2}(t_o))}{\dot{i}_{s1}^2 + \dot{i}_{s2}^2}.$$

12. The method of claim 9, wherein if said amount of time remaining before a next corner point is negative then a switch to a next actual-value vector immediately takes place.

13. The method of claim 10, wherein if said amount of time remaining before a next corner point is negative then a switch to a next actual-value vector immediately takes place.

14. The method of claim 11, wherein if said amount of time remaining before a next corner point is negative then a switch to a next actual-value vector immediately takes place.

15. The method of claim 3, wherein if a negative value is determined for one of said interval times, a corresponding actual value is not used in calculating an amount of time remaining before a next corner point.

16. The method of claim 4, wherein if a negative value is determined for one of said interval times, a corresponding actual value is not used in calculating an amount of time remaining before a next corner point.

17. The method of claim 5, wherein if a negative value is determined for one of said interval times, a corresponding actual value is not used in calculating an amount of time remaining before a next corner point.

18. An apparatus for regulating a two-dimensional vector of a controlled system comprising:

a discrete value final controlling element having a limited switching frequency and generating a limited number of discrete switch combinations, such that each of said switch combinations represents a discrete actual-value vector;

a microprocessor, which receives a periodically asserted interrupt signal, such that a variable reference-value vector and said two-dimensional vector of said controlled system are read into said microprocessor after said interrupt signal is received, said microprocessor determining three actual-value vectors being adjacent to said reference value vector;

said discrete value final controlling element alternating, in a predetermined sequence and at predetermined interval times, between the generation of said three actual-value vectors in said discrete value setting element during a switching period along a reference trajectory, such that a switch from one actual-value vector to another actual-value vector takes place when a distance between said two-dimensional vector and a next corner point of said reference trajectory is at a minimum, and such that a mean value of said two-dimensional vector is generated, said mean value being equal to said reference value;

said microprocessor having a plurality of outputs and supplying to a first output a value equal to an amount of time remaining before a next corner point is reached and supplying to a second output a value equal to a vector number of a next actual-value vector.

19. The apparatus of claim 18, wherein said microprocessor generates a plurality of switching signals for said discrete value setting element.

* * * * *